United States Patent [19]

Church

[11] Patent Number: 5,146,405
[45] Date of Patent: Sep. 8, 1992

[54] METHODS FOR PART-OF-SPEECH DETERMINATION AND USAGE

[75] Inventor: Kenneth W. Church, Chatham, N.J.

[73] Assignee: AT&T Bell Laboratories, Murray Hill, N.J.

[21] Appl. No.: 152,740

[22] Filed: Feb. 5, 1988

[51] Int. Cl.$^5$ ............................................. G06F 15/38
[52] U.S. Cl. .................................... 364/419; 364/400
[58] Field of Search .................................. 381/51–53, 381/41, 43–45; 364/513.5, 900 MS File, 200 MS File, 419; 434/167, 169

[56] References Cited

U.S. PATENT DOCUMENTS

| | | | |
|---|---|---|---|
| 3,704,345 | 11/1972 | Coker et al. | 179/1 SA |
| 4,456,973 | 6/1984 | Carlgren et al. | 364/900 |
| 4,580,218 | 4/1986 | Raye | 364/300 |
| 4,586,160 | 4/1986 | Amano et al. | 364/900 |
| 4,661,924 | 4/1987 | Okamoto et al. | 364/900 |
| 4,674,065 | 6/1987 | Lange et al. | 364/900 |
| 4,688,195 | 8/1987 | Thompson et al. | 364/300 |
| 4,692,941 | 9/1987 | Jacks et al. | 381/52 |

OTHER PUBLICATIONS

DeRose, "Grammatical Category Disambiguation by Statistical Optimization", Computational Linguistics, vol. 14, No. 1, Jul. 1988, pp. 31–39.
Cherry et al., "Writing Tools—The Style and Diction Programs", AT&T Bell Laboratories, pp. 1–14.
Jelinek, "Markov Modeling of Text Generation", Proceedings of the NATO Advanced Study Institute, 1985, Martinus Nijhoff Publishers, pp. 569–598.
European Conf. on Speech Technology, vol. 1, Sep. 1987, Edingburg, GB, pp. 389–392; & E. Vivalda: "Contextual Syntactic Analysis for text-to-speech conversion", the whole document.
ICASSP 85 Proc., vol. 4, Mar. 1985, Florida, U.S. pp. 1577–1580; & B. Merialdo: "Probabilistic Grammar for Phonetic to french Transciption", the whole document.
Proc. of the Spring Joint Computer Conf., Atlantic City, NJ Apr. 30, 1968, Washington, pp. 339–344; J. Allan: "Machine-to-Man Communication by speech Part II: Synthesis of Prosodic features of speech by rule", the whole document.
Wallraff, Barbara, "The Literate Computer", The Atlantic Monthly, Jan. 1988 pp. 64 at 68.
Leech, G. et al, "The Automatic Grammatical Tagging of the LOB Corpus", ICAME News, 7, 13–33 (1983).
Marcus, M., A Theory of Syntactic Recognition for Natural Language, MIT Press, Cambridge, Mass. 1980, pp. 37, 38, 175, 199–201.
Fudge, E., English Word Stress, George Allen & Unwin (Publishers) Ltd., London, 1984.
Francis, W. N., et al., Frequency Analysis of English Usage, Houghton Mifflin Co., 1982, pp. 6–8 ("List of Tags").
Allen, J. From Text to Speech: The MIT Talk System, Cambridge University Press, Cambridge, Mass. (1987) Chapter 10 "The Fundamental Frequency Frequency Generator").
Cherry, L. L., "A System for Assigning Word Classes to English Text", Computer Science Technical Report No. 81 Jun. 1978.

Primary Examiner—Emanuel S. Kemeny
Attorney, Agent, or Firm—G. E. Nelson; W. L. Wisner

[57] ABSTRACT

Methods for determination of parts of speech of words in a text or other non-verbal record are extended to include so-called Viterbi optimization based on stored statistical data relating to actual usage and to include noun-phrase parsing. The part-of-speech tagging method optimizes the product of individual word lexical probabilities and normalized three-word contextual probabilities. Normalization involves dividing by the contained two-word contextual probabilities. The method for noun phrase parsing involves optimizing the choices of, typically non-recursive, noun phrases by considering all possible beginnings and endings thereof, preferably based on the output of the part-of-speech tagging method.

6 Claims, 2 Drawing Sheets

SPEECH SYNTHESIZER
(BASED ON FIG. 1 OF U.S. PATENT # 3,704,345)

FIG. 4

METHODS FOR PART-OF-SPEECH DETERMINATION AND USAGE

Field of the Invention

This invention relates to methods for part-of-speech determination and to methods for usage of the results, including intermediate methods of nounphrase parsing, and including speech synthesis, speech recognition, training of writers, proofreading, indexing and data retrieval.

Background of the Invention

It has been long recognized that the ability to determine the parts of speech, especially for words that can be used as different parts of speech, is relevant to many different problems in the use of the English language. For example, it is known that speech "stress", including pitch, duration and energy, is dependent on the particular parts of speech of words and their sentence order. Accordingly, speech synthesis needs parts-of-speech analysis of the input written or non-verbal text to produce a result that sounds like human speech.

Moreover, automatic part-of-speech determination can play an important role in automatic speech recognition, in the education and training of writers by computer-assisted methods, in editing and proofreading of documents generated at a word-processing work station, in the indexing of a document, and in various forms of retrieval of word-dependent data from a data base.

For example, some of these uses can be found in various versions of AT&T's Writer's Workbench ®. See the article by Barbara Wallraff, "The Literate Computer," in *The Atlantic Monthly*, January 1988, pp. 64ff, especially page 68, the last two paragraphs. The relationship of parts of speech to indexing can be found in U.S. Pat. No. 4,580,218 issued Apr. 1, 1986, to C. L. Raye.

Heretofore, two principal methods for automatic part-of-speech determination have been discussed in the literature and, to some extent, employed. The first depends on a variety of "ad hoc" rules designed to detect particular situations of interest. These rules may relate, for example, to using word endings to predict part-of-speech, or to some adaptation thereof. Some ad hoc rules for part-of-speech determination have been used in the Writer's Workbench ® application program running under the UNIX TM Operating System. These rules tend to be very limited in the situations they can successfully resolve and to lack underlying unity. That technique is described in *Computer Science Technical Report*, No. 81, "PARTS—A System for Assigning Word Classes to English Text", by L.L. Cherry, June 1978, Bell Telephone Laboratories, Incorporated.

The second principal method, which potentially has greater underlying unity is the "n-gram" technique described in the article "The Automatic Tagging of the LOB Corpus", in *ICAME News*, Vol. 7, pp. 13–33, by G. Leech et al., 1983, University of Lancaster, England. Part of the technique there described makes the assigned part of speech depend on the current best choices of parts of speech of certain preceding or following words, based on certain rules as to likely combinations of successive parts of speech. With this analysis, various ad hoc rules are also used, so that, overall, this method is still less accurate than desirable. In addition, this method fails to model lexical probabilities in a systematic fashion.

The foregoing techniques have not generated substantial interest among researchers in the art because of the foregoing considerations and because the results have been disappointing.

Indeed, it has been speculated that any "n-gram" technique will yield poor results because it cannot take a sufficiently wide, or overall, view of the likely structure of the sentence. On the other hand, it has not been possible to program robustly into a computer the kind of overall view a human mind takes in analyzing the parts of speech in a sentence. See the book *A Theory of Syntactic Recognition for Natural Language*, by M. Marcus, MIT Press, Cambridge, Mass., 1980. Consequently, the "n-gram" type part-of-speech determination, as contrasted to "n-gram" word frequency-of-occurrence analysis, have been largely limited to tasks such as helping to generate larger bodies of fully "tagged" text to be used in further research. For that purpose, the results must be corrected by the intervention of a very capable human.

Nevertheless, it would be desirable to be able to identify parts-of-speech with a high degree of likelihood with relatively simple techniques, like the "n-gram" technique, so that it may be readily applied in all the applications mentioned at the outset, above.

SUMMARY OF THE INVENTION

According to one feature of the my invention, parts of speech are assigned to words in a message by optimizing the product of individual word lexical probabilities and normalized three-word contextual probabilities. Normalization employs the contained two-word contextual probabilites. Endpoints of sentences (including multiple spaces between them), punctuation and words occurring with low frequency are assigned lexical probabilities and are otherwise treated as if they were words, so that discontinuities encountered in prior n-gram part-of-speech assignment and the prior use of "ad hoc" rules tend to be avoided. The generality of the technique is thereby established.

According to another feature of my invention, a message in which the words have had parts-of-speech previously assigned has its noun phrases identified in a way that facilitates their use for speech synthesis. This noun phrase parsing also may have other applications. Specifically, the noun phrase parsing method is a highly probabilistic method that initially assigns beginnings and ends of noun phrases at every start or end of a word and progressively eliminates such assignments by eliminating the lowest probability assignments, until only very high probability non-recursive assignments remain. By non-recursive assignments, I mean that no noun phrase assignment is retained that is partly or wholly within another noun phrase.

Alternatively, the method of this feature of my invention can also retain some high-probability noun phrases that occur wholly within other noun phrases, since such assignments are useful in practice, for example, in speech synthesis.

Some noun phrase assignments which are always eliminated are endings without corresponding beginnings (e.g., at the start of a sentence), or beginnings without endings (e.g., at the end of a sentence), but my method further eliminates low-probability assignments of the beginnings and ends of noun phrases; or, to put it another way, retains only the highest probability assignments.

According to a subsidiary feature of my invention, other low-probability noun phrases are eliminated by repetitively scanning each sentence of a message from beginning to end and, on each scan, multiplying the probabilities for each pair of a beginning and an end, and then keeping those combinations with a product near or above the highest probability previously obtained for the region of the sentence, or at least are not inconsistent with other high probability noun phrases.

According to still another feature of my invention, the output of my parts-of-speech assignment method may be the input to my noun-phrase-parsing method. In this context the maximum likelihood optimization techniques used in both methods tend to reinforce each other, since each method, by itself, is superior in performance to that of its prior art.

BRIEF DESCRIPTION OF THE DRAWING

Further features and advantages of my invention will become apparent from the following detailed description, taken together with the drawing, in which.

DESCRITPION OF ILLUSTRATIVE EMBODIMENTS

Figure 1:
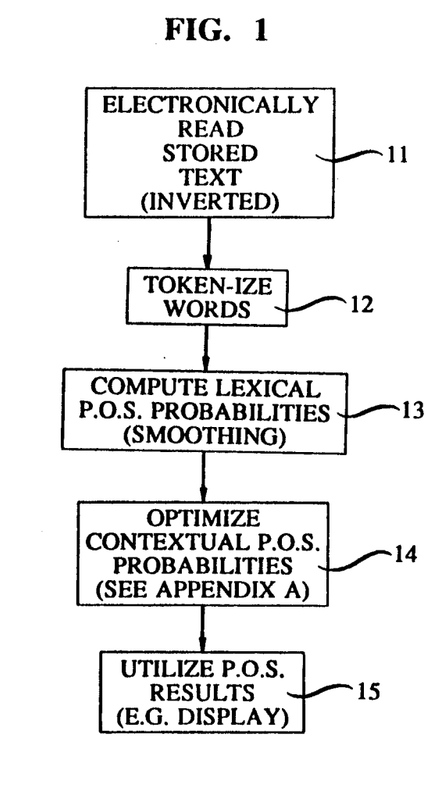
FIG. 1 is a flow diagram of a parts-of-speech assignment method according to my invention.

In the method of FIG. 1, we shall assume for purposes of illustration that the message was a text message which has been read and stored in an electronic form. The first step then becomes, as indicated in block 11, to read the stored text, sentence by sentence. This step requires determining sentence boundaries. There are many known techniques, but I prefer to make the initial assumption that every period ends a sentence and then to discard that sentence and its results when my method subsequently demonstrates that the period had a more likely use.

In any event, my method proceeds to operate on each sentence, starting from the end.

The subsequent steps can be grouped into three general steps: token-izing the words (block 12); computing the lexical part-of-speech probabilities (block 13), starting from the end of the sentence; and optimizing the contextual part-of-speech probabilities (block 14), with, of course, the general final step (15) of applying the result to any of the many possible uses of part-of-speech analysis.

These general steps can be broken down into many more detailed steps, as will now be explained.

In token-izing words, I make certain minor but important modifications of the usual linguistic approach to part-of-speech analysis. Nevertheless, for convenience, I use the same designations of parts of speech as set out in the "List of Tags" in the book by W. Nelson Francis et al. *Frequency Analysis of English Usage*, Houghton Mifflin Co., 1982, at pages 6–8. They will be repeated herein wherever helpful to understanding examples.

Token-izing includes the identification of words and certain non-words, such as punctuation and parentheses. In addition, I have found it important to assign two blank spaces after every sentence period to generate a new set of frequencies for such spaces in a tagged body of text such as that which formed the basis for the Francis et al. book (the antecedent body of text is commonly called the "Brown Corpus"). Token types involved in the process are the actual words of a sentence and structural indicators which inform the process that the end of a sentence has been reached. Those structural indicators include, for example, and end-of-sentence indicator, such as the machine-readable character for a period, a heading or paragraph indicator represented by a corresponding formatting character stored in the manuscript, filed, or file, along with the text words, and an end-of-file indicator.

Looking ahead a bit, we shall see each final word in a sentence will have its contextual probability measured together with that for the period and the following blank. These form a "trigram"; and the probability analysis therefore is exploring the question: "How likely is it that this word, as a certain part of speech, can end a sentence?" In this case the contextual probabilities of observing the period in this position is very high (near 1.0); and the contextual probability for the blank is 1.0. In any event, those probabilities are the same in both numerator and denominator of the normalized probability, so the resultant contextual probability is just the measured probability of seeing the subject part of speech at the end of a sentence which, in turn, is a statistic that can be tabulated from the text corpus and stored in a permanent memory of the computer.

After token-izing the observed words and characters, as explained in connection with block 12, my method next computes the lexical part of speech probabilities (the probability of observing part of speech i given word j), dependent upon frequency of occurrence, as follows: If every sense of every word of interest appeared with a reasonably high frequency in the Brown Corpus, that calculation would be simply the quotient of the observed frequency of occurrence of the word as a particular part of speech, divided by its total frequency of occurrence, regardless of part of speech.

I replace this calculation, for words or characters of low frequency of occurrence, as follows: consider that, under Zipf's law, no matter how much text we look at, there will always be a large tail of words that appear only a few times. In the Brown Corpus, for example, 40,000 words appear five times or less. If a word such as *yawn* appears once as a noun and once as a verb, what is the probability that it can be an adjective?It is impossible to say wtihout more information. Fortunately, dictionaries can help alleviate this problem to some extent. We add one to the frequency count of possibilities in the dictionary. For example, *yawn* happens to be listed in our dictionary as either a noun or a verb. Thus, we smooth the possibilities. In this case, the probabilities remain unchanged. Both before and after smoothing, we estimate *yawn* to be a noun 50% of the time, and a verb the rest. There is no chance that *yawn* is an adjective.

In some other cases, smoothing makes a big difference. Consider the word *cans*. This word appears 5 times as a plural noun and never as a verb in the Brown Corpus. The lexicon (and its morphological routines), fortunately, give both possibilities. Thus, the revised estimate is that *cans* appears 6/7 times as a plural noun and 1/7 times as a verb.

Thus, we add "one" to each observed frequency of occurrence as each possible part of speech, according to the training material, an unabridged dictionary; and calculate the lexical probabilities therefrom.

To start to construct our probability search tree for this word, we now multiply that lexical probability by the normalized estimated contextual probability, i.e., the frequency of observing part of speech X given the succeeding parts of speech Y and Z, already determined, divided by the "bigram" frequency of observing part of speech Y given part of speech Z. The latter two data can be tabulated from an already tagged corpus, referenced by Francis et al in their book. The tabulated data are stored in a computer memory.

We proceed to repeat the above process for the subject word as every other part of speech it can be, keeping only the maximum probabilities from our prior sets of calculations. Before we proceed to the next to last word in the sentence, we have arrived at a maximum product probability for the last word.

Two things can already be observed about the process. First, the lexical probabilities that are used in the product lie along a continium and are not just one of three arbitrarily assigned values, as used in the Leech et al. reference. Second, while the applications of the mathematics may seem trivial for words which in fact turn out to be at the end of a sentence, the important point is that it is the same mathematics which is used everywhere.

As we proceed to give a more complete, specific example, keep in mind that the probability estimates were obtained by training on the tagged Brown Corpus, which is referred to but not contained in the above-cited analysis by Francis et al. It is a corpus of approximately 1,000,000 words with part of speech tags assigned and laboriously checked by hand.

Overall preformance of my method has been surprisingly good, considering that its operation is strictly local in nature and that, in general, it has no way to look on both sides of a noun phrase, for example, to determine the usage of what may an auxiliary verb, for instance. If every possibility in the dictionary must be given equal weight, parsing is very difficult. Dictionaries tend to focus on what is possible, not on what is likely. Consider the trivial sentence, "I see a bird." For all practical purposes, every word in the sentence is unambiguous. According to Francis and Kucera, the word "I" appears as a pronoun in 5837 out of 5838 observations (100%), "see" appears as a verb in 771 out of 772 observations (100%), "a" appears as an article in 23013 out of 23019 observations (100%) and "bird" appears as a noun in 26 out of 26 observations (100%). However, according to Webster's Seventh New Collegiate Dictionary, every word is ambiguous. In addition to the desired assignments of tags (parts of speech), the first three words are listed as nouns and the last as an intransitive verb. One might hope that these spurious assignments could be ruled out by the parser as syntactically ill-formed. Unfortunately, the prior art has no consistent way to achieve that result. If the parser is going to accept noun phrases of the form:

[NP [N city] [N school][N committee][N meeting]], then it cannot rule out

[NP[N I][N see] [N a] [N bird]] (where "NP" stands for "noun phrase"; and "N" stands for "noun").

Similarly, the parser probably also has to accept bird as an intransitive verb, since there is nothing syntactically wrong with:

[S[NP[N I][N see][N a]] [VP [V bird]]], where "S" stands for "subject" and "VP" stands for "verb phrase" and "V" stands for "verb".

These part-of-speech assignments are not wrong; they are just extremely improbable.

Consider once again the sentence, "I see a bird." The problem is to find an assignment of parts of speech to words that optimizes both lexical and contextual probabilities, both of which are estimated from the Tagged Brown Corpus. The lexical probabilities are estimated from the following frequencies (PPSS=singular pronoun; NP=proper noun; VB=verb; UH=interjection; IN=preposition; AT=article, NN=noun):

| Word | Parts of Speech | | | |
|---|---|---|---|---|
| I | PPSS | 5837 | NP | 1 |
| see | VB | 771 | UH | 1 |
| a | AT | 23013 | In (French) | 6 |
| bird | NN | 26 | | |

The lexical probabilities are estimated in the obvious way. For example, the probability that "I" is a pronoun, Prob(PPSS|"I"), is estimated as the freq(PPSS "I")/freq("I") or 5837/5838. The probability that "see" is a verb is estimated to be 771/772. The other lexical probability estimates follow the same pattern.

The contextual probability, the probability of observing part of speech X, given the following two parts of speech Y and Z, is estimated by dividing the trigram part-of-speech frequency XYZ by the bigram part-of-speech frequency YZ. Thus, for example, the probability of observing a verb before an article and a noun is estimated to be the ratio of the freq(VB, AT, NN) over the freq(AT, NN) or 3412/53091=0.064. The probability of observing a noun in the same context is estimated as the ratio of freq(NN, AT, NN) over 53091 or 629/53091=0.01. The other contextual probability estimates follow the same pattern.

A search is performed in order to find the assignment of part of speech tags to words that optimizes the product of the lexical and contextual probabilities. Conceptually, the search enumerates all possible assignments of parts of speech to input words. In this case, there are four input words, three of which are two ways ambiguous, producing a set of 2*2*2*1=8 possible assignments of parts of speech to input words:

| I | see | a | bird |
|---|---|---|---|
| PPSS | VB | AT | NN |
| PPSS | VB | IN | NN |
| PPSS | UH | AT | NN |
| PPSS | UH | IN | NN |
| NP | VB | AT | NN |
| NP | VB | IN | NN |
| NP | UH | AT | NN |
| NP | UH | IN | NN |

Each of the eight sequences are then scored by the product of the lexical probabilities and the contextual probabilities, and the best sequence is selected. In this case, the first sequence is by far the best.

In fact, it is not necessary to enumerate all possible assignments because the scoring function cannot see more than two words away. In other words, in the process of enumerating part-of-speech sequences, it is possible in some cases to know that some sequence cannot possibly compete with another and can therefore be abandoned. Because of this fact, only O(n) paths will be enumerated. Let us illustrate this optimization with an example:

Find all assignments of parts of speech to "bird" and score the partial sequence. Henceforth, all scores are to be interpreted as log probabilities.

(−4.848072 "NN")

Find all assignments of parts of speech to "a" and score. At this (−7.4453945 "AT" "NN")

(−15.01957 "IN" "NN")

Now, find assignments of "see" and score. At this point, the number of pats still seems to be growing exponentially.

(−10.1914 "VB" "AT" "NN")

(−18.54318 "VB" "IN" "NN")

(−29.974142 "UH" "AT" "NN")

(−36.53299 "UH" "IN" "NN")

Now, find assignments of "I" and score. Note that it is no longer necessary, though, to hypothesize that "a" might be a French preposition IN because all four paths, PPSS VB IN NN, NN VB IN NN, PPSS UH IN NN and NP UH IN NN score less well than some other path and there is no way that any additional input could change the relative score. In particular, the path PPSS VB IN NN scores lower than the path PPSS VB AT NN, and additional input will not help PPSS VB IN NN because the contextual scoring function has a limited window of three parts of speech, and that is not enough to see past the existing PPSS and VB.

(−12.927581 "PPSS" "VB" "AT" "NN")

(−24.177242 "NP" "VB" "AT" "NN")

(−35.667458 "PPSS" "UH" "AT" "NN")

(−44.33943 "NP" "UH" "AT" "NN")

The search continues two more iterations, assuming blank parts of speech for words out of range.

(−13.262333 blank "PPSS" "VB" "AT" "NN")
(−26.5196 blank "NP" "VB" "AT" "NN")
Finally, the result is: PPSS VB AT NN.
(−13.262333 blank blank "PPSS" "VB" "AT" "NN")
A slightly more interesting example is: "Can they can cans."
cans
(−5.456845 "NNS"), where "NNS" stands for "plural noun".
can
(−12.603266 "NN" "NNS")
(−15.935471 "VB" "NNS")
(−15.946739 "MD" "NNS"), where "MD" stands for "model auxiliary".
they
(−18.02618 "PPSS" "MD" "NNS")
(−18.779934 "PPSS" "VB" "NNS")
(−21.411636 "PPSS" "NN" "NNS")
can
(−21.766554 "MD" "PPSS" "VB" "NNS")
(−26.45485 "NN" "PPSS" "MD" "NNS")

(−28.306572 "VB" "PPSS" "MD" "NNS")
(−21.932137 blank "MD" "PPSS" "VB" "NNS")
(−30.170452 blank "VB" "PPSS" "MD" "NNS")
(−31.453785 blank "NN" "PPSS" "MD" "NNS")

For other details of the method—optimizing probabilities, refer to Appendix A. Appendix A shows a high level computer program implementation of the processing shown in FIG. 1, illustratively using so-called Viterbi Algorithm techniques.

The Viterbi algorithm (VA) was initially introduced for finding maximum likelihood decodings for convolutional codes. See, for example, J. Viterbi, "Error Bounds for Convolutional Codes and an Asymptotically Optimum Decoding Algorithm," *IEEE Trans. on Information Theory*, Vol. IT-13, pp. 260–269, 1967. The algorithm is also described in G. D. Forney, Jr. "The Viterbi Algorithm," *Proceedings of the IEEE*, Vol. 16, pp. 268–278, 1973.

Forney, in "Maximum Likelihood Sequence Estimation of Digital Sequences in the Presence of Intersymbol Interference," *IEEE Trans. on Information Theory*, Vol. IT-18, pp. 363–378, 1972, also showed that the VA is a maximum likelihood decoding algorithm for trellis codes and used it for equalizing channels with intersymbol interference. The VA has also been used for demodulation of trellis-coded modulation. See J. K. Omura, "On the Viterbi Decoding Algorithm," *IEEE Trans. on Information Theory*, Vol. IT-15, pp. 177–179, 1969. The VA has also been used for demodulation of partial response continuous phase modulation. See J. B. Anderson, T. Aulin and C. E. Sundberg, *Digital Phase Modulation*, Plenum Press, N.Y. 1986.

Various generalizations of the standard VA have been presented in the literature. See, A. M. Michelson and A. H. Levesque, *Error-Control Techniques for Digital Communication*, John Wiley & Sons, N.Y. 1985. In "Convolutional Codes II: Maximum Likelihood Decoding," *Inf. Control*, 25, pp. 222–266, Jul. 1974 and "Convolutional Codes III: Sequential Decoding," *Inf. Control*, 25, pp. 267–297, Jul. 1974, Forney proposed a list-of-2 maximum likelihood decoder, but only for the purpose of obtaining insight into the analysis of sequential decoding techniques.

In "A List-Type Reduced-Constraint Generalization of the Viterbi Algorithm," *IEEE Trans. Inf. Theory*, IT-33, pp. 866–876, Nov. 1987, Hashimoto has proposed a list type reduced-constraint generalization of the Viterbi algorithm which contains the Viterbi algorithm and the so-called (M,L) algorithm as special cases.

The use of the Viterbi Algorithm in the context of estimating the likelihood of words in a string of words is treated in Jelinek, F., "Markov Source Modeling of Text Generation," *Proc. NATO Advanced Study Institute on The Impact of Processing Techniques on Communications*, Kluwer Academic Publishers, Hingham, Mass., 1983, especially pages 581–583."

This description completes the description of operation through that of block 14.

As an example of the utilization occurring in block 15, display is conceptually the simplest, but still practical, particularly in an interactive system with a human operator. More elaborate example of utilization will be given hereinafter in the description of FIGS. 3 and 4. But first, it is desirable to describe one more tool. That tool is noun phrase parsing, using an extension of my method.

Figure 2:
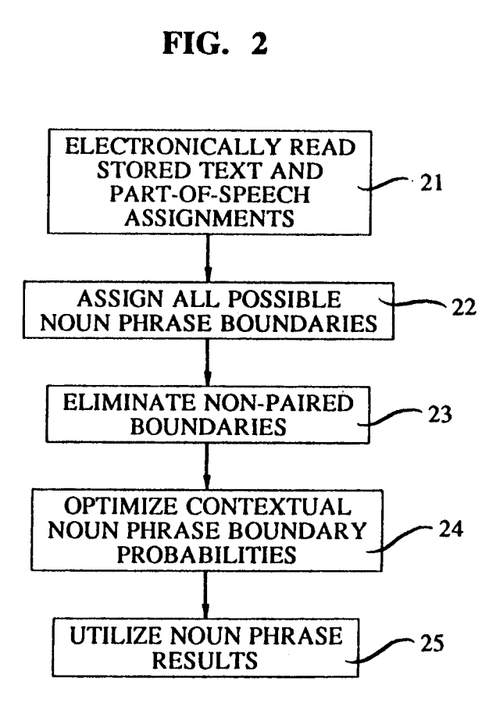
FIG. 2 is a flow diagram of a noun phrase parsing method according to my invention.

Similar stochastic methods have been applied to locate simple noun phrases with very high accuracy. The proposed method is a stochastic analog of precedence parsing. Recall that precedence parsing makes use of a table that says whether to insert an open or close bracket between any two categories (terminal or non-terminal). The proposed method makes use of a table that gives the probabilities of an open and close bracket between all pairs of parts of speech. A sample is shown below for the five parts of speech: AT (article), NN (singular noun), NNS (non-singular noun), VB (uninflected verb), IN (preposition). These probabilities were estimated from about 40,000 words of training material selected from the Brown Corpus. The training material was parsed into noun phrases by laborious semi-automatic means.

|  |  | Second Word | | | | |
| --- | --- | --- | --- | --- | --- | --- |
|  |  | AT | NN | NNS | VB | IN |
| Probability of starting a Noun Phrase, Between First and Second Words | | | | | | |
| First Word | AT | 0 | 0 | 0 | 0 | 0 |
|  | NN | .99 | .01 | 0 | 0 | 0 |
|  | NNS | 1.0 | .02 | .11 | 0 | 0 |
|  | VB | 1.0 | 1.0 | 1.0 | 0 | 0 |
|  | IN | 1.0 | 1.0 | 1.0 | 0 | 0 |
| Probability of Ending a Noun Phrase, Between First and Second Words | | | | | | |
| First Word | AT | 0 | 0 | 0 | 0 | 1.0 |
|  | NN | 1.0 | .01 | 0 | 1.0 | 1.0 |
|  | NNS | 1.0 | .02 | .11 | 1.0 | 1.0 |
|  | VB | 0 | 0 | 0 | 0 | 0 |
|  | IN | 0 | 0 | 0 | 0 | .02 |

The stochastic parser is given a sequence of parts of speech as input and is asked to insert brackets corresponding to the beginning and end of noun phrases. Conceptually, the parser enumerates all possible parsings of the input and scores each of them by the precedence probabilities. Consider, for example, the input sequence: NN VB. There are 5 possible ways to bracket this sequence (assuming no recursion):
NN VB
[NN] VB
[NN VB]
[NN] [VB]
NN [VB]

Each of these parsings is scored by multiplying 6 precedence probabilities, the probability of an open/close bracket appearing (or not appearing) in any one of the three positions (before the NN, after the NN or after the VB). The parsing with the highest score is returned as output.

The method works remarkably well considering how simple it is. There is some tendency to underestimate the number of brackets and run two noun phrases together.

It will be noted that noun phrase parsing, as described in FIG. 2, assumes the output from the part of speech assignment of FIG. 1 as its input. But it could also use the results of any other part of speech assignment technique.

In either event, in block 22, all possible noun phrase boundaries are assigned. In block 23, non-paired boundaries are eliminated. For each sentence, these would include an ending boundary at the start of the sentence, and a beginning boundary at the end of a sentence (including blanks).

The operation of block 24 involves laying out a probability tree for each self-consistent assignment of noun-phrase boundaries. The highest probability assignments are then retained for later processing, e.g., utilization of the results, as indicated in block 25.

Now, let us turn to a more specific application of my invention. Part of speech tagging is an important practical problem with potential applications in many areas including speech synthesis, speech recognition, spelling correction, proofreading, query answering, machine translation and searching large text data bases (e.g., patents, newspapers). I am particularly interested in speech synthesis applications, where it is clear that pronunciation sometimes depends on part of speech. Consider the following three examples where pronunciation depends on part of speech.

First, there are words like "wind" where the noun has a different vowel than the verb. That is, the noun "wind" has a short vowel as in "the wind is strong," whereas the verb "wind" has a long vowel as in "Do not forget to wind your watch."

Secondly, the pronoun "that" is stressed as in "Did you see THAT?" unlike the complementizer "that," as in "It is a shame that he is leaving."

Thirdly, note the difference between "oily FLUID" and "TRANSMISSION fluid"; as a general rule, an adjective-noun sequence such as "oily FLUID" is typically stressed on the right whereas a noun-noun sequence such as "TRANSMISSION fluid" is typically stressed on the left, as stated, for example, by Erik Fudge in *English Word Stress*, George Allen & Unroin (Publishers) Ltd., London 1984. These are but three of the many constructions which would sound more natural if the synthesizer had access to accurate part of speech information.

Figure 3:
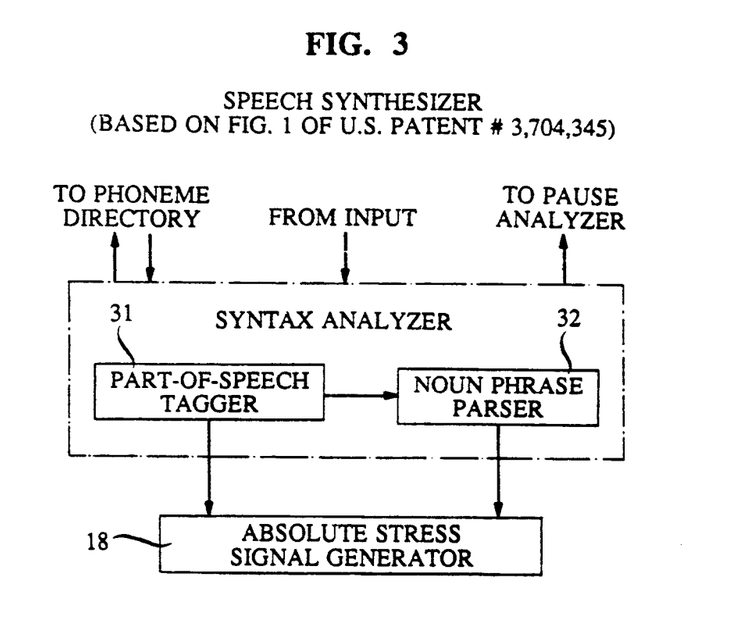
FIG. 3 is a block-diagrammatic showing of a speech synthesizer employing the methods of FIGS. 1 and 2.

In FIG. 3, the part of speech tagger 31 is a computer employing the method of FIG. 1. Noun phrase parser 32 is a computer employing the method of FIG. 2.

The outputs of tagger 31 and parser 32 are applied in a syntax analyzer to provide the input signals for the absolute stress signal generator 18 of FIG. 1 of U.S. Pat. No. 3,704,345 issued to C. H. Coker, et al.

As an example of the rules under discussion, attention is directed to Appendix 5.1 at pages 144-149 of the Fudge book, which sets forth the rules for noun phrases.

In other respects, the operation of the embodiment of FIG. 3 is like that of the embodiment of FIG. 1 of the Coker patent.

Figure 4:
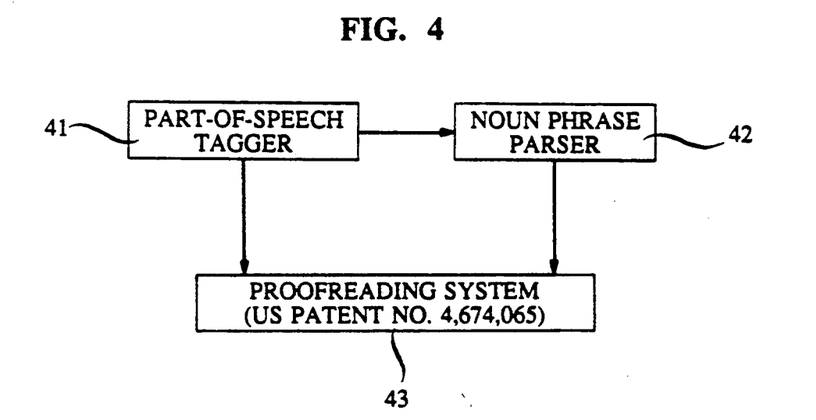
FIG. 4 is a block-diagrammatic showing of a text editing employing the method of FIG. 1.

Similarly, in the embodiments of FIG. 4, part of speech tagger 41 functions as described in FIG. 1: and noun phrase parser 42 functions as described in FIG. 2.

In that case, the noun phrase and parts of speech information is applied in the text editing system 43, which is of the type described in U.S. Pat. No. 4,674,065 issued to F. R. Lange et al. Specifically, part-of-speech tagger 41 and noun phrase parser 42 provide a substitute for "parts of speech" Section 33 in the Lange et al. patent to assist in generating the editing displays therein. The accuracy inherent is my method of FIGS. 1 and 2 should yield more useful editing displays than is the case in the prior art.

Alternatively, text editing system 43, may be the Writer's Workbench ® system described in *Computer Science Technical Report*, No. 91 "Writing Tools—The STYLE & Diction Programs", by L. L. Cherry, et al., February, 1981, Bell Telephone Laboratories, Incorporated. My methods would be a substitute for the method designated "PARTS" therein.

It should be apparent that various modifications of my invention can be made without departing from the spirit and scope thereof.

For example, one way of implementing the stress rules of the Fudge book would be by the algorithm disclosed by Jonathan Allen et al., in the book *From Text to Speech: The MIT Talk System*, the Cambridge University Press, Cambridge (1987), especially Chapter 10, "The Fundamental Frequency Generator".

Further, the lexical probabilities are not the only probabilities that could be improved by smoothing. Contextual frequencies also seem to follow Zipf's Law. That is, for the set of all sequences of three parts of speech, we have plotted the frequency of the sequence against its rank on log paper and observed the classic linear relationship and slope of almost −1. It is clear that smoothing techniques could well be applied to contextual frequencies alternatives. The same can also be said for the procedure probabilities used in noun phrase parsing.

The techniques of my invention also have relevance to other applications, such as speech recognition. Part-of-speech contextual probabilities could make possible better choices for a spoken word which is to be recognized.

My techniques can also be substituted directly for the described part-of-speech tagging in the system for interrogating a database disclosed in U.S. Pat. No. 4,688,195, issued Aug. 18, 1987 to C. W. Thompson et al.

Other modifications and applications of my invention are also within its spirit and scope.

APPENDIX A

INPUT a file of the form:

```
<word> <pos> <lex_prob> <pos> <lex_prob> <pos> <lex_prob> ...
<word> <pos> <lex_prob> <pos> <lex_prob> <pos> <lex_prob> ...
<word> <pos> <lex_prob> <pos> <lex_prob> <pos> <lex_prob> ...
<word> <pos> <lex_prob> <pos> <lex_prob> <pos> <lex_prob> ...
    .
    .
    .
<word> <pos> <lex_prob> <pos> <lex_prob> <pos> <lex_prob> ...
```

Each line corresponds to a word (token) in the sentence (in reverse order). The <pos> and <lex_prob> are parts of speech and lexical probabilities.

OUTPUT the best sequence of parts of speech

```
new_active_paths := {}       : set of no paths
A path is a record of of a sequence of parts of speech and a score. The variable old_active_paths is
initialized to a set of 1 path the path contains a sequence of no parts of speech and a likihood score of
1.0
old_active_paths := { <parts: [], score:1.0> }   ; set of 1 path
    input:
        line := readline()
        if (line == end_of_file) goto finish
        word := popfield(line)
        while(line is not empty)
            pos := popfield(line)
            lex_prob := popfield(line)
                loop for old_path in old_active_paths
                    old_parts := old_path→parts
                    old_score := old_path→score
                    new_parts := concatenate(old_parts, pos)
                    new_score := lex_prob * old_score * contextral_prob(new_parts)
                    new_path := make_record(new_parts,
                    new_score)
                    if(new_score > score of paths in new_active_paths
                    with the same last two parts of speech)
                        new_active_paths :=
                        add new_path to new_active_paths
            old_active_paths := new_active_paths
            new_active_paths := {}
        goto input
    finish:
        find path is new_active_paths with best score
        output path→parts
    contextual_prob([ ... x y z]):
            return(freq(x y z)/freq(x y))
```

Input file:

| Word  | Pos   | Lex_Prob    | Pos | Lex_Prob |
|-------|-------|-------------|-----|----------|
| blank | blank | 1.0         |     |          |
| blank | blank | 1.0         |     |          |
| bird  | NN    | 1.0         |     |          |
| a     | AT    | 23013/23019 | IN  | 6/23019  |
| see   | VB    | 771/772     | UH  | 1/772    |
| I     | PPSS  | 5837/5838   | NP  | 1/5838   |
| blank | blank | 1.0         |     |          |
| blank | blank | 1.0         |     |          |

Output file:

blank blank NN AT VB PPSS blank blank

Trace of old_active_paths:
(henceforth, scores should be interpreted as log probabilities)
After processing the word "bird," old_active_paths is
{<parts: [NN blank blank] score: −4.848072>}
After processing the word "a," old_active_paths is

APPENDIX A-continued

```
{<parts: [AT NN blank blank] score: −7.4453945>
<parts: [IN NN blank blank] score: −15.01957>}
After the word "see"
{<parts: [VB AT NN blank blank] score: −10.1914>
<parts: [VB IN NN blank blank] score: −18.54318>
<parts: [UH AT NN blank blank] score: −29.974142>
<parts: [UH IN NN blank blank] score: −36.53299>}
After the word "I"
{<parts: [PPSS VB AT NN blank blank] score: −12.927581>
<parts: [NP VB AT NN blank blank] score: −24.177242>
<parts: [PPSS UH AT NN blank blank] score: −35.667458>
<parts: [NP UH AT NN blank blank] score: −44.33943>}
The search continues two more iterations, assuming blank parts of speech for words out of range.
{<parts: [blank PPSS VB AT NN blank blank] score: −13.262333>
<parts: [blank NN VB AT NN blank blank] score: −26.5196>}
finally
{<parts: [blank blank PPSS VB AT NN blank blank] score: −13.262333>}
```

What is claimed is:

1. An automated method for assigning parts of speech to words in a message, of the type comprising the steps of:

storing data in a computer system which is relevant to words likely to be in the message and usages of said words as various parts of speech, and employing processing means in the computer system to select for each word in the message a likely part of speech responsive to a likely part of speech for at least an adjacent word in the message and responsive to said stored data, said method being characterized in that:

the storing step comprises storing statistical data relating to: (1) the actual likelihood of occurrence of each one of said likely words as a particular part of speech (hereinafter, the lexical likelihood), and (2) the actual likelihoods of occurrence of each of said words as a particular part of speech when occurring adjacent to words that are particular parts of speech (hereinafter, the contextual likelihood), and the selecting step comprises maximizing, for each word in the message, its overall likelihood of being a particular part of speech by a finite-state optimization technique commonly known as the "Viterbi" optimization technique, said technique being responsive to both the stored lexical likelihoods for each said word and the stores contextual likelihoods for at least said adjacent word.

2. An automated method of the type claimed in claim 1, further assigning paired noun phrase beginning and end boundaries in said message, said method further characterized by the steps:

assigning all possible noun phrase boundaries, eliminating all non-paried boundaries, and optimizing contextual noun phrase boundary probabilities.

3. An automated method of the type claimed in claim 1 said method being further characterized in that the step of storing statistical data includes storing data which has been smoothed to eliminate unlikely part-of-speech usage, and the selecting step further includes determining the product of lexical probability and the contextual probability, where the lexical probability is estimated as the quotient of the frequency of occurrence of the word as a particular part of speech, divided by its frequency of occurrence as all parts of speech, and the contextual probability is estimated by dividing the trigram frequency by the bigram frequency, where the trigram frequency is the frequency of occurrence of the particular part of speech in sequence with the two following parts of speech, as already determined for the two following words, and the bigram frequency is the frequency of occurrence of the particular part of speech of the following word in sequence with the next-following part of speech, as already determined for the next-following word; and reiterating the determining step for a number of possible part-of-speech combinations, including retaining products which exceed prior products for the same word.

4. An automated method for determining beginning and end boundaries of noun phrases in a message comprising a sequence of words, said method being characterized by the steps of:

storing data in a computer system, the data regarding the probability of noun phrase boundaries occurring between said words, and in processing means in the computer system, performing the steps of assigning all possible noun phrase boundaries, eliminating all non-paired boundaries, and selecting optimum choices for said boundaries using contextual noun phrase boundary probabilities based on said stored data.

5. An automated method of the type claimed in claim 1 or 4, said method being characterized by said storing step comprising storing information relating to the joint frequency of occurrence of parts of speech for groups of nearby words, said method being further characterized by said selecting step comprising assigning parts of speech in the message by n-gram analysis with respect to the parts of speech of near-by words, including the steps of representing certain non-words as words having empirically determined frequencies of occurrence in a non-verbal record of the message, computing an optimum normalized contextual probability that each other near-by word in the message is a particular part of speech in relationship to the contextual part-of-speech probabilities of differing uses of said non-words, where the normalized contextual probability is the trigram part-of-speech probability divided by the bigram part-of-speech probability, all determined by starting at the end of a sentence, including blank spaces.

6. An automated method of the type claimed in claim 1 or claim 3, further characterized in that the storing step includes storing statistical data relating to:

(1) the actual likelihood of occurrence of each one of certain tokens, which are non-words such as punctuation and extra spaces occurring before and after sentences (the lexical likelihood), and (2) the actual likelihoods of occurrence of each of said tokens when occurring adjacent to words that are particular parts of speech or adjacent to other tokens (the contextual likelihood), and the selecting step treats the tokens as if they were words.

* * * * *

UNITED STATES PATENT AND TRADEMARK OFFICE
CERTIFICATE OF CORRECTION

PATENT NO. : 5,146,405
DATED : September 8, 1992
INVENTOR(S) : Kenneth W. Church It is certified that error appears in the above-indentified patent and that said Letters Patent is hereby corrected as shown below:

```
In column 13, line 45, "stores" should read --stored--;
              line 52, "non-paried should read --non-paired--.
```

Signed and Sealed this

Twenty-sixth Day of October, 1993

Attest:

BRUCE LEHMAN

*Attesting Officer*     *Commissioner of Patents and Trademarks*